Patented Sept. 20, 1927.

1,642,666

UNITED STATES PATENT OFFICE.

CLARENCE W. AVERY, OF DETROIT, AND DAN O. MOODY, OF HIGHLAND PARK, MICHIGAN, ASSIGNORS TO FORD MOTOR COMPANY, OF DETROIT, MICHIGAN, A CORPORATION OF DELAWARE.

ARTICLE MADE FROM A RUBBER COMPOSITION.

No Drawing.   Application filed September 13, 1920. Serial No. 409,934.

The object of our invention is to provide an improved article made from rubber composition and the process of making same, of simple, durable and inexpensive construction.

The object of our invention is to further provide articles made from rubber compositions which are to include comparatively cheap substances, whereby the articles made therefrom may have the advantages arising from the use of rubber and at the same time the material and manufacturing cost may be reduced to a minimum.

A further object of our invention is to provide compositions and processes of making articles which may be used for the construction of comparatively large articles which must be made from water-proof material and which must be able to withstand considerable vibration and heavy blows.

Still a further object of our invention is to provide articles which are made from compositions such that the central portion or core is reinforced to withstand blows and vibrations, and yet a smooth hard finishing coat is provided.

A further object of our invention is to provide a method for making articles with the core and outside surface made from different materials, which are, however, vulcanized into a unitary structure, thereby allowing the core and cover to be of different coefficients of elasticity.

With these and other objects in view, our invention consists in the combination of the various ingredients of our compositions, the allocations of the compound, and a method of vulcanizing them into a unitary structure.

In the practice of our invention we have found that by using a core or central portion for the articles mentioned, which is composed of a rubber compound having incorporated therein fibrous material, that the article is enabled to withstand vibration and blows while at the same time it is substantially rigid. A finishing coat or cover member is placed upon this core which does not have fibrous material therein, so that the finishing material presents a smooth, lustrous, and hard finish which may be handled or subjected to blows without discoloring, marring or otherwise imparing its appearance.

In the composition of our improved core member we have used the following formula:

| | Per cent by weight. |
|---|---|
| Pale crepe (Hevea rubber) | 11.45 |
| Brown crepe (Hevea rubber) | 7.60 |
| Reclaimed rubber | 14.25 |
| Bitumen for rubber compounding | 18.10 |
| Hydrated lime | 4.80 |
| Sulphur | 6.20 |
| Ground straw and excelsior | 30.00 |
| Inert filler for rubber compounding | 7.60 |

In this formula materials are given their commercial names but the following notes might be added for identification: The pale crepe is sometimes known as "first latex crepe", and is first quality rubber, whereas, brown crepe ordinarily consists of surface skimmings, natural coagulated lump and some of the better grades of scrap, the latter being also called "brown Ceylon". The reclaimed rubber mentioned is a commercial product and is obtained by separating the fillers and other materials from rubber compounds, and devulcanizing the rubber. The inert filler which we have found most satisfactory, is an insoluble clay or earth consisting chiefly of aluminum silicate. The ground straw and excelsior which we have used, usually consisted of equal parts of excelsior and straw, ground or shredded to place the material in fibrous form, and then well mixed.

In the preparation of this core material the ingredients are mixed on rubber mixing rolls until thoroughly mixed, and the material is then shaped to form a core for the article which is to be manufactured.

For the cover members of our articles, we have used the following compounds:

| | Per cent by weight. |
|---|---|
| Smoked sheet (Hevea rubber) | 27.05 |
| Reclaimed rubber | 3.75 |
| Bitumen for rubber compounding | 12.30 |
| Ground waste rubber | 7.50 |
| Hydrated lime | 2.45 |
| Litharge | 4.65 |
| Sulphur | 10.70 |
| Inert filler for rubber compounding | 6.65 |
| Lead oleate | 0.65 |
| Ground asbestos | 23.65 |
| Carbon black | 0.65 |

These materials are thoroughly mixed on rubber rolls and then shaped to form the cover members for the articles which are to be manufactured. The core members and cover members are then assembled by wrapping or otherwise placing the cover member around the core, and the assembled article is placed in a vulcanizing mould. With the formula as above given we preferably vulcanize the articles for fifty minutes under a fifty pound steam pressure. This pressure and time is satisfactory with the formula given where the article to be vulcanized will weigh approximately two pounds and does not have a diameter varying greatly from an inch and one-half.

We have used the above formulæ and process of making the articles in connection with the rims for the steering wheels for automobiles and have found that such a rim may be rapped very sharply with a comparatively heavy instrument without denting or marring the finish. The rim also retains its finish and color under the exposure to weather and contact from the hands of the driver, indefinitely. We have also thrown a rim so constructed against a brick wall from a considerable distance and have dropped it to the floor without breaking it or bending it, or permanently altering its shape. It will, therefore, be seen that we are enabled to construct from our improved formulæ, in their combination, articles which are substantially indestructible under any ordinary conditions to which they are subjected. The principal of construction and formulæ may be used for any articles requiring similar qualities.

It will be noted that the percentage of vulcanizing agent in the core member is substantially less than that present in the cover member, so that a substantially greater resiliency is obtained in the central portion of the core than on the cover. The resulting difference in the co-efficient of elasticity is not great enough to permit the core to bend sufficiently to crack the hard rubber cover, but does act as a cushion to prevent cracks from various causes which would occur in the cover member if the core member were rigid. The fibrous nature of the core member together with the fact that the fibre which we have here disclosed is substantially inelastic, makes the core substantially unbreakable unless an exceedingly great force is applied to it.

We have found that the proportions of the mixtures may be varied somewhat without departing from the spirit of the invention herein disclosed and it will be understood that the formulæ here given are wholly by way of example to illustrate the manner in which our invention is used in connection with a particular article. For instance—the relative brittleness of the cover member may be varied by varying the proportion of the vulcanizing agent, the color may be changed by changing the coloring member, the co-efficient of elasticity may be changed by varying the proportion of rubber to the mineral, or by varying the proportion of the new rubber to the reclaimed or waste rubber. The hardness of the materials may also be varied by varying the time and pressure of the vulcanizing process or the size of the article being vulcanized. Such changes, however, as adapt our invention for use for similar purposes are to be included within the scope of our claims.

We claim as our invention:

1. As a new article of manufacture, a steering wheel rim comprising a core of fibers and rubber, and a casing of rubber, the whole being vulcanized.

2. A steering wheel rim, comprising a molded rubber composition core, and a casing of rubber vulcanized around said core.

3. A steering wheel rim, comprising a rubber composition core, composed of particles of rubber and fibrous material, and a casing of rubber enclosing the core, the two being vulcanized.

CLARENCE W. AVERY.
DAN O. MOODY.